(12) United States Patent
Viertel

(10) Patent No.: US 6,231,105 B1
(45) Date of Patent: May 15, 2001

(54) SUN VISOR FOR VEHICLE

(76) Inventor: Lothar Viertel, Uheilstr 4, D-66802 Altforweiler (DE)

( * ) Notice: Subject to any disclaimer, the term of this patent is extended or adjusted under 35 U.S.C. 154(b) by 0 days.

(21) Appl. No.: 09/507,989

(22) Filed: Feb. 18, 2000

(30) Foreign Application Priority Data

Feb. 20, 1999 (DE) .............................................. 199 07 403

(51) Int. Cl.[7] .................................. B60J 3/00; B60R 1/12
(52) U.S. Cl. ......................... 296/97.2; 296/97.5; 359/864
(58) Field of Search .................... 296/97.2, 97.5; 359/841, 849, 850, 855, 864, 865, 881

(56) References Cited

U.S. PATENT DOCUMENTS

| 4,521,051 | * | 6/1985 | Cody et al. . | |
|---|---|---|---|---|
| 4,648,011 | * | 3/1987 | Boote et al. . | |
| 4,711,483 | * | 12/1987 | Gulette et al. . | |
| 4,961,608 | * | 10/1990 | Nash | 296/97.5 |

FOREIGN PATENT DOCUMENTS

| 3325169 | * | 1/1985 | (DE) | 296/97.5 |
|---|---|---|---|---|
| 3814182 | | 9/1989 | (DE) . | |
| 296 08 764 U1 | * | 10/1996 | (DE) . | |
| 0053663 | * | 6/1982 | (EP) | 296/97.5 |
| 2429685 | * | 1/1980 | (FR) | 296/97.5 |

* cited by examiner

Primary Examiner—D. Glenn Dayoan
Assistant Examiner—Patricia L. Engle
(74) Attorney, Agent, or Firm—Foley & Lardner

(57) ABSTRACT

A sun visor for vehicles having a visor body, a recess in a broadside of the visor body, and a mirror unit which is placed in the recess. The mirror unit features a plane mirror, a concave mirror, and a slide cover, and a covering material surrounding the visor body with an opening exposing a mirror field. The arrangement is struck in such a way, that the plane mirror, the concave mirror, or alternatively the slide cover is visible in the mirror field. The slide cover can slide over one of the two mirrors, that is rigidly connected with the mirror unit in the region of the mirror field. The other of the two mirrors can slide over the slide cover.

15 Claims, 1 Drawing Sheet

SUN VISOR FOR VEHICLE

BACKGROUND OF THE INVENTION

1. Technical Field

The invention relates to a sun visor for vehicles.

2. Discussion

DE3814182A1 shows a sun visor for vehicles with a visor body, a recess in a broadside of the visor body and a mirror unit which is placed in the recess and features a plane mirror, a concave mirror, and a cover flap.

A sun visor for vehicles with a visor body, a recess in a broadside of the visor body, and a mirror unit, which is placed in the recess and features a plane mirror and a concave mirror, is shown in the publication in accordance with DE29608764U1. The mirror unit includes a mirror cartridge, which the plane mirror and concave mirror fit into, whereby the plane mirror is supposed to move collapsible or slidable in relation to the concave mirror and the concave mirror is supposed to move collapsible or slidable in relation to the plane mirror.

It is the objective of the invention in principle, to make available a sun visor of the type named in the introduction, which will distinguish itself with better utility features compared to the state of the art, and whose mirror unit is simple to manufacture and also especially simple to handle, a fact which applies in particular to the mirror's cover, which is demanded by the customer, when the standard mirror (plane mirror) and/or the magnifying mirror (concave mirror) is or are not currently being used or will not be used.

SUMMARY OF THE INVENTION

In accordance with the teachings of the present invention, a sun visor is provided for. The sun visor has a sun visor body with portions of the sun visor body defining a recess therein. A mirror unit is positioned in the recess of the sun visor body. The mirror unit includes a plane mirror, a concave mirror, and a slide cover. Either the plane mirror or the concave mirror is slidably positioned on the mirror unit. Additionally, the slide cover is also slidably positioned on the mirror unit. At least one covering material substantially covers the visor body with portions of the cover material defining a visible mirror field. The slide cover and one of the mirrors are operable to be positioned substantially within the mirror field with the mirror being operable to be positioned over the slide cover. The other mirror is fixedly positioned substantially within the visible mirror field using at least one mounting.

The special advantage of the invention is seen in the fact, that either the plane mirror, the concave mirror, or alternatively the slide cover can be seen in the mirror field. One of the two mirrors, the concave mirror for example, is always located in the region of the mirror field and can be uncovered by shifting the slide cover, or it can be covered to prevent blinding. The other mirror, the plane mirror for example, will be in its normal location outside the mirror field, but can be moved into the mirror field by a simple shift, and thereby be put into use. In this case, the slide cover can be located between the concave and plane mirrors.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
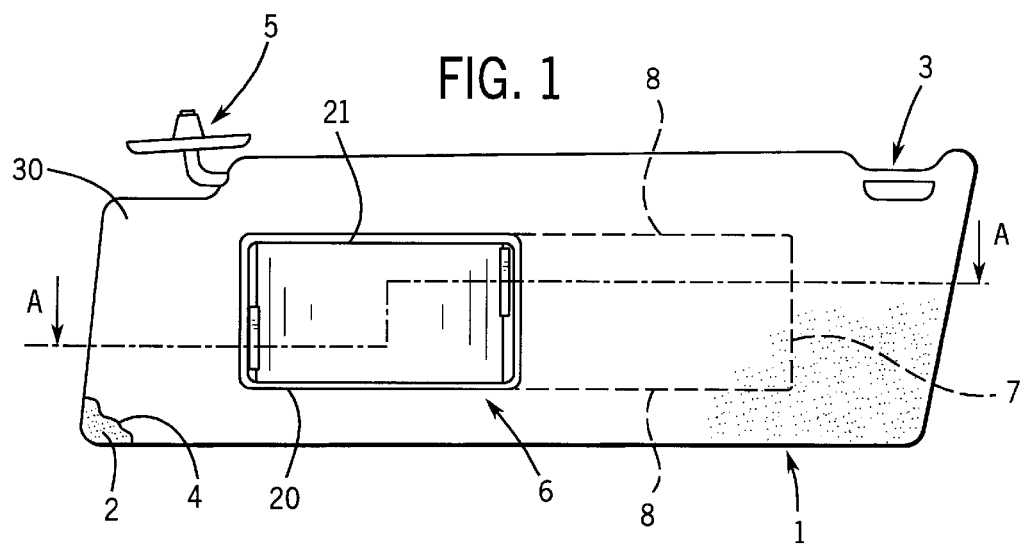
FIG. 1 is a front view of a sun visor made in accordance with the teachings of the present invention.
Figure 2:
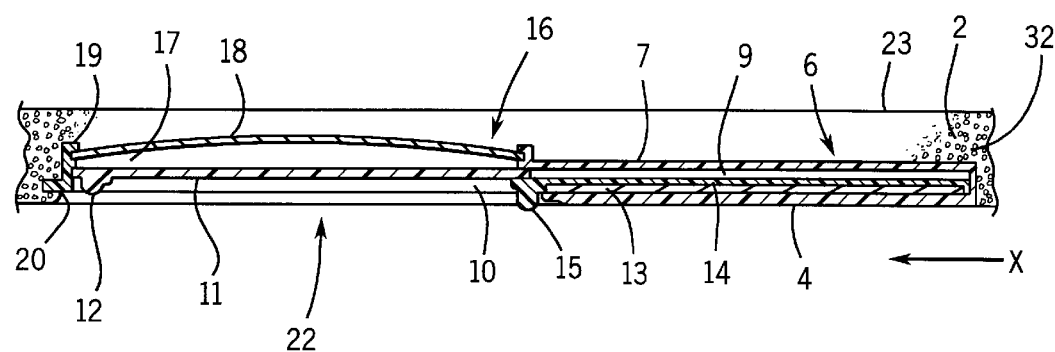
FIG. 2 is a cross sectional view following the line A—A in FIG. 1.

FIG. 1 represents a complete sun visor, having a visor body 2 with a built-on thrust bearing area 3, a first covering material 4, a bearing unit 5, and a complete mirror unit 6, which is mounted imbedded in the visor body 2, as represented in FIG. 2, section A—A. The visor body 2 has a broadside 30 and a narrow side 32.

The complete mirror unit 6 consists of a cartridge frame 7, which is designed approximately rectangular and provided with two guide notches 9 and 10 separated from each other on its inner longitudinal sides 8, wherein the guide notch 9 functions as a guide track for the plastic slide cover 11 with locally built-on handle 12. The guide notch 10 functions as a guide track for a standard mirror or plane mirror 13 and a plastic partial frame 14 and a local handle 15 built onto it.

Locally on its backside 16, the cartridge frame 7 has an approximately rectangular empty space 17 for receiving or being occupied by an approximately rectangular concave mirror 18 for example, which is clipped in there by at lease one mounting 19, clip noses 19 for example, located on the backside 16 of the cartridge frame 7.

Alternatively, the standard mirror 13 can be positioned in the empty space 17 and the concave mirror 18 can be positioned in the guide notch 10. One of ordinary skill in the art will readily recognize that positioning the mirrors 13 and 18 in this manner will require slight dimensional modifications to the visor body 2 and the mirror unit 6.

During manufacture, the cartridge frame 7, a plastic injection molded piece, is connected with the first covering material 4 as in FIG. 2, specifically by means of a surrounding welding seam 20, whereby an approximately rectangular window opening 21 is also formed, among other things.

The standard mirror 13, preferably of glass, together with its partial frame 14 with its built-on handle 15, is inserted into its guide notch 10 in the cartridge frame 7. Next, the plastic slide cover 11 is inserted into the guide notch 9 provided for it in the frame 7, as illustrated in section A—A. Finally, the concave mirror 18, preferably of glass, is mounted.

The sun visor's body 2 is now equipped with this assembly and is welded all around with a second covering material 23 and the first covering material 4 on the backside.

The operation of a preferred embodiment of the sun visor will now be described.

The slide cover 11 is closed. The concave mirror 18, which doesn't move, is located behind the slide cover 11 and is therefore hidden. The standard mirror 13 with its frame 14 isn't visible, because it's covered by the cartridge frame 7 with its pocket-shaped recess and the covering material. The optical image of the mirror field 22 can therefore be depicted as in FIG. 1. The following operating variations will now arise from this starting position.

The slide 11 is now opened by its handle 12, which is located on the bottom half. After moving it, the observer will be looking directly at the concave mirror 18. Alternatively, the slide 11 will remain shut (corresponding to section A—A in FIG. 2) and the standard mirror 13 will be pushed out of its position in a direction depicted by arrow X, corresponding to FIG. 2, in front of the slide 11 by means of a built-on handle 15, located on the top half. Afterwards, the observer will be looking into the standard mirror 13.

If the observer now wants to look directly from the standard mirror 13 into the magnifying mirror 18, he/she can use the handle 12 of the slide 11, whereby the standard mirror 13, positioned in front of slide 11, can automatically be shifted along with it. To close the now visible concave mirror 18, the slide 11 is shifted in front of the magnifying mirror 18 by its handle 12, and the image corresponding to FIG. 1 results.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A sun visor for a vehicle comprising:

a visor body having a broadside;

a recess in said broadside of said visor body;

a mirror unit which is placed in the recess and features a plane mirror, a concave mirror, and a slide cover; and a covering material surrounding said visor body with an opening exposing a visible mirror field, whereby one of said plane mirror, said concave mirror, and said slide cover are visible in said mirror field, said slide cover can slide over one of said two mirrors, whereby said one of said two mirrors being rigidly connected with s aid mirror unit in the region of said visible mirror field, and the other of said two mirrors being operable to slide over said slide cover.

2. The sun visor as recited in claim 1, wherein said mirror unit features a cartridge frame with mountings f or one of said two mirrors, a guide notch for the other of said two mirrors, and a guide notch for said slide cover.

3. The sun visor as recited in claim 1, wherein said mirror unit includes a pocket-shaped recess for said sliding mirror and for said slide cover when said sliding mirror and said slide cover are positioned away from said mirror field.

4. The sun visor as recited in claim 1, wherein said sliding mirror and said slide cover a re equipped with a handle.

5. A sun visor comprising:

a visor body, at least a portion of said visor body defining a recess in said visor body;

a mirror unit having a plane mirror, a concave mirror, and a slide cover, one of said plane mirror and said concave mirror being slideably positioned on said mirror unit, said slide cover being slideably positioned on said mirror unit, said mirror unit being positioned in said recess of said visor body; and at least one covering material substantially covering said visor body, at least a portion of said at least one covering material defining a visible mirror field, whereby said slide cover is operable to be substantially positioned within said visible mirror field and said one of said plane mirror and said concave mirror is operable to be substantially positioned within said mirror field over said slide cover.

6. The sun visor of claim 5, wherein said other of said plane mirror and said concave mirror is fixedly positioned substantially within said visible mirror field with at least one mounting.

7. The sun visor of claim 6, wherein said at least one mounting is a clip nose.

8. The sun visor of claim 5, wherein said mirror unit includes a plurality of guide notches, said slide cover being slideably positioned within one of said guide notches and said one of said plane mirror and said concave mirror being slideably positioned within another of said guide notches such that said plurality of guide notches are operable as guide tracks to substantially position said slide cover and said one of said plane mirror and said concave mirror within said visible mirror field.

9. The sun visor of claim 5, wherein said slide cover has a handle and said one of said plane mirror and said concave mirror has a handle.

10. The sun visor of claim 9, wherein said handle of said slide cover is engagable with said handle of said one of said plane mirror and said concave mirror such that sliding said slide cover away from said mirror field causes said one of said plane mirror and said concave mirror to slide away from said mirror field.

11. The sun visor of claim 5, wherein said mirror unit includes a cartridge frame having at least one mounting and a plurality of guide notches, said at least one mounting being attached to said other of said plane mirror and said concave mirror, said at least one mounting positioned on said cartridge frame such that said other of said plane mirror and said concave mirror is fixedly positioned substantially within said mirror field, said slide cover being slideably positioned within one of said guide notches and said one of said plane mirror and said concave mirror being slideably positioned within another of said guide notches such that said plurality of guide notches are operable as guide tracks to substantially position said slide cover and said one of said plane mirror and said concave mirror within said mirror field.

12. The sun visor of claim 11, wherein said cartridge frame is attached to said at least one covering material.

13. The sun visor of claim 11, wherein said at least one mounting is a clip nose.

14. The sun visor of claim 11, wherein said slide cover has a handle and said one of said plane mirror and said concave mirror has a handle.

15. The sun visor of claim 14, wherein said handle of said slide cover is engagable with said handle of said one of said plane mirror and said concave mirror such that sliding the slide cover away from said mirror field causes said one of said plane mirror and said concave mirror to slide away from said mirror field.

* * * * *